UNITED STATES PATENT OFFICE.

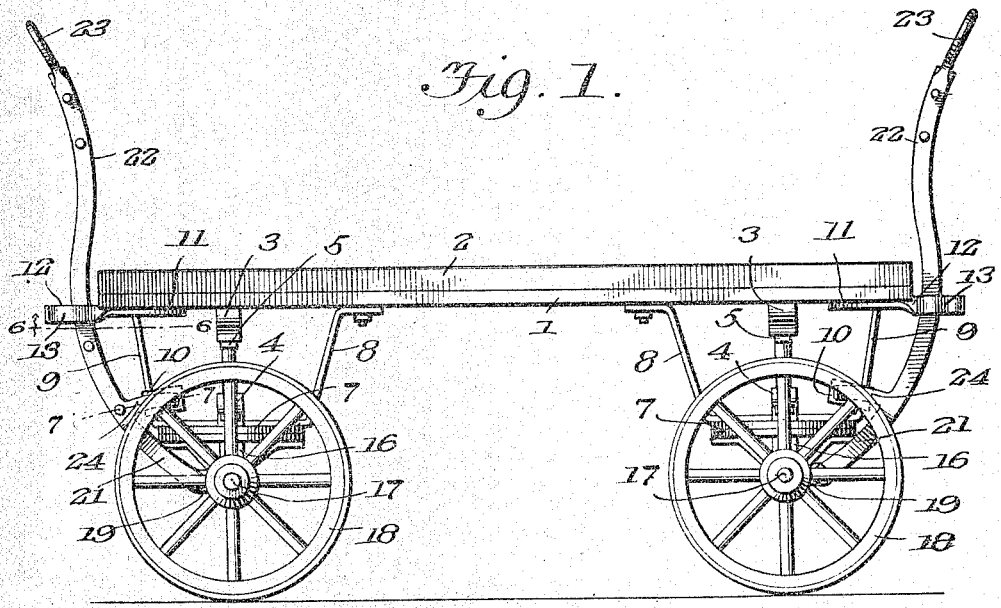
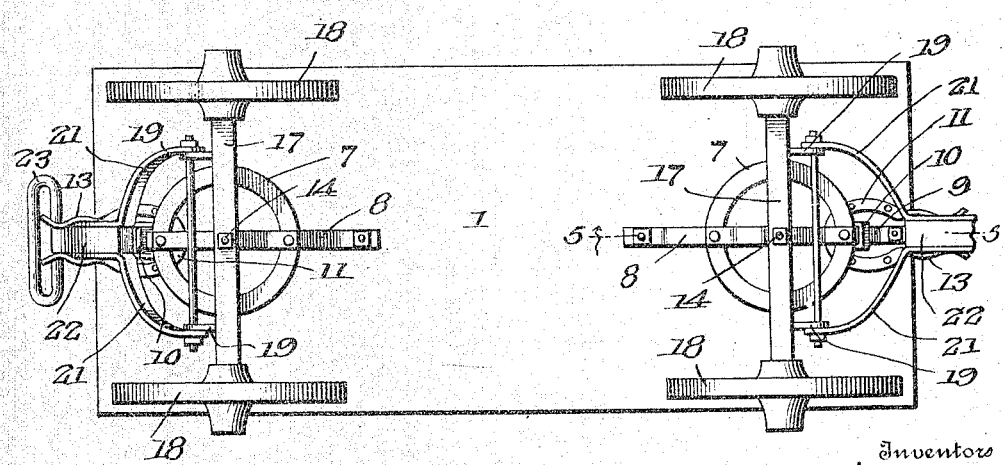

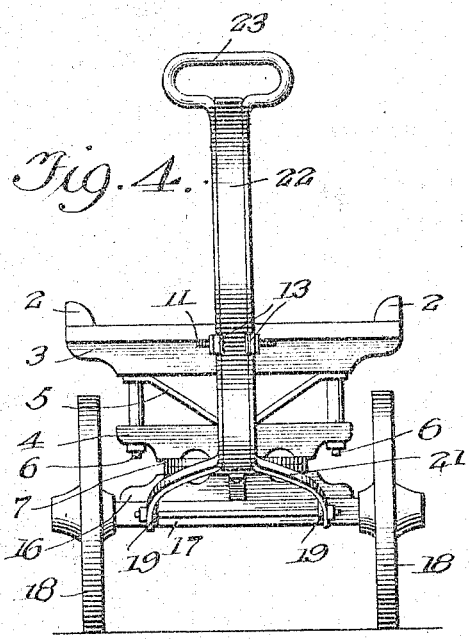

ROBERT R. KOHLMAN AND HENRY R. SIEMONS, OF DANFORTH, ILLINOIS.

TRUCK.

1,177,526.  Specification of Letters Patent.  Patented Mar. 28, 1916.

Application filed March 20, 1915. Serial No. 15,932.

*To all whom it may concern:*

Be it known that we, ROBERT R. KOHLMAN and HENRY R. SIEMONS, citizens of the United States, residing at Danforth, in the county of Iroquois and State of Illinois, have invented new and useful Improvements in Trucks, of which the following is a specification.

The present invention relates to improvements in trucks which are primarily adapted for hauling freight at a railway station, factories, etc., where the truck space is narrow or where the distance between the trucks or cars is such as to not permit of the turning of the truck therebetween, and the primary object of the invention is to construct a truck having its opposite ends provided with a handle whereby the truck may be propelled in two directions without necessitating the turning of said truck, and so reduce the liability of injury being inflicted to the truckman.

A further object of the invention is to provide an ordinary baggage truck with handles upon its opposite ends and to arrange one or both of the said handles with catch or securing devices which will prevent the swinging movement of either of the axles upon its fifth wheel, so that the said truck will be caused to travel in a straight path in one of two directions, the said handles also providing the end gates or stop members to prevent articles upon the truck from being accidentally removed therefrom in a longitudinal direction, while either of said handles may be readily removed from its gripping elements to permit of said truck being drawn in the desired direction.

In the drawings: Figure 1 is a side elevation of a truck constructed in accordance with the present invention, both of the handles being shown in their elevated or gripped position, Fig. 2 is a bottom plan view of the same, one of the handles being in its lowered or operative position, Fig. 3 is an end elevation of the same with the handle in its lowered or operative position, Fig. 4 is a similar view with the handle in its gripped or elevated position, Fig. 5 is a central longitudinal sectional view approximately on the line 5—5 of Fig. 2, Fig. 6 is a horizontal sectional view on the line 6—6 of Fig. 1, Fig. 7 is a similar sectional view on the line 7—7 of Fig. 1.

In the drawings, the numeral 1 designates the body or platform of the truck, the same being provided at its longitudinal edges with upwardly projecting cleats or flanges 2, so that an article placed on the truck will not be accidentally removed laterally therefrom, and in order to facilitate the removal of said article from the said truck, the inner faces of the flanges are preferably rounded or curved.

Secured upon the underface of the platform 1, adjacent each of the opposite ends thereof is a transversely arranged bolster 3, and suitable bolts passing through the platform and through the bolster 3 secure a sand board 4 to the bolster. This sand board is maintained in spaced relation with the bolster through the medium of a substantially V-shaped member 5, the same centrally contacting with the upper face of the sand board and having its diverging arms off-set or provided with feet through which the bolts 6 pass. Secured centrally to the underface of the sandboard 4 is the upper member 7 of a fifth wheel, and the said upper member is either integrally formed with or has connected thereto, at diametrically opposite points, arranged central of the longitudinal plane of the platform 1, with an inner and outer angular arm 8 and 9 respectively which have their upper ends bent laterally and secured to the underface of said platform. The outer arm 9, at a suitable distance above the upper member of the fifth wheel is provided with a substantially U-shaped clip 10, or a member which has its opposite sides inclined outwardly from its inner end or from its end connected with the arm 9. Secured upon the underface of the platform 1 is the flat substantially U-shaped body 11 of a spring member 12, the ends of the U-shaped member being turned or twisted at a right angle to its body proper and comprising a pair of rounded arms 13.

The numeral 14 designates the king bolt which passes through the apex of the V-shaped member 5, through the sand board and through the central portion of the upper member of the fifth wheel as well as through the axle tree 16 and the axle 17 upon which the axle tree 16 rests. The axle has arranged for rotation upon its opposite ends wheels 18, and the outer face of each of the axles 17 is provided with clips 19 to which are loosely connected the tongue hounds 21, the said hounds being secured to the opposite sides of a tongue or pole 22, and the said pole has its outer end provided with a handle 23. The side members of the hounds at approximately their connection with the sides of the pole 22 are formed with oppositely disposed fingers 24, the said fingers being preferably constructed of spring material, and when the pole is elevated these fingers 24 are adapted to frictionally contact with the opposite sides of the member or members 10 arranged upon the arm 9, and likewise the opposite sides of the extensions of said tongue hounds or the opposite sides of the tongue are received between the spring arms of the clip 12 and so retain the pole and handle in an elevated or non-operative position upon the body of the truck. When in such position, it will be apparent that neither of the tongues nor the wheels arranged upon the axles to which the tongues are connected can rotate upon their king pin, and the said wheels will be maintained longitudinally of the body or platform 1, but it will be also apparent that either of the tongues may be readily withdrawn from frictional engagement with the members contacting therewith so that the said truck may be propelled longitudinally in either direction.

In order that the poles may assume approximately a right angle with respect to the platform 1, when the said poles are in their raised position, we have found it necessary to round the said poles as illustrated in the drawing, and as previously stated, one or both of the said poles may be employed as a stop member for the material with which the truck is loaded.

From the above description, taken in connection with the accompanying drawings, the simplicity of the device, as well as the advantages thereof, will, it is thought, be perfectly apparent to those skilled in the art to which such invention appertains without further detailed description.

Having thus described the invention, what we claim is:—

1. A truck having a pivoted axle, a tongue pivotally mounted upon said axle, a securing device mounted upon the body of said truck, fingers mounted upon said tongue and adapted to engage said securing device when the tongue is in vertical position whereby said tongue will be locked and the axle held against pivotal movement with relation to the truck, and a spring member mounted upon said body for holding the tongue in vertical position, said axle being free to turn upon its pivot when the tongue is relieved from the influence of said securing device and said spring member.

2. A truck having a pivoted axle, a tongue pivotally mounted upon the axle, a securing device mounted upon the body of said truck, fingers mounted upon the tongue adjacent its pivot and adapted to engage the said securing device when the tongue is in vertical position whereby it will be locked and the axle held against pivotal movement with relation to the body of the truck, and means mounted upon the body of the truck above said securing device for holding the tongue in vertical position said axle being free to turn on its pivot when the tongue is relieved from the influence of the said securing device and the said holding means.

In testimony whereof we affix our signatures in presence of two witnesses.

ROBERT R. KOHLMAN.
HENRY R. SIEMONS.

Witnesses:
ARTHUR J. MEENTS,
M. R. MEENTS.